United States Patent [19]

Asghar et al.

[11] Patent Number: 5,043,932

[45] Date of Patent: * Aug. 27, 1991

[54] APPARATUS HAVING MODULAR INTERPOLATION ARCHITECTURE

[75] Inventors: Safdar M. Asghar; John G. Bartkowiak, both of Austin, Tex.

[73] Assignee: Advanced Micro Devices, Inc., Sunnyvale, Calif.

[*] Notice: The portion of the term of this patent subsequent to Feb. 19, 2008 has been disclaimed.

[21] Appl. No.: 429,207

[22] Filed: Oct. 30, 1989

[51] Int. Cl.$^5$ .............................................. G06F 7/38
[52] U.S. Cl. .................................................. 364/723
[58] Field of Search ................. 364/723, 724.01, 724.1

[56] References Cited

U.S. PATENT DOCUMENTS

| | | | |
|---|---|---|---|
| 3,964,443 | 6/1976 | Hartford | 364/723 X |
| 4,497,035 | 1/1985 | Yabuuchi et al. | 364/723 X |
| 4,736,663 | 4/1988 | Wawrzynek et al. | 364/724.01 X |
| 4,757,465 | 7/1988 | Hakoopian et al. | 364/723 |
| 4,835,724 | 5/1989 | Costas | 364/724.03 |

Primary Examiner—Dale M. Shaw
Assistant Examiner—Tan V. Mai
Attorney, Agent, or Firm—Foley & Lardner

[57] ABSTRACT

An apparatus adaptable for use with a digital-analog conversion device for effecting communications from a digital device to an analog device, having a digital-analog circuit for converting interpolated outgoing digital signals to outgoing analog signals. The apparatus further has a digital signal processing circuit for interpolating outgoing digital signals received from the digital device and providing an interpolated outgoing digital signal to the digital-analog device. The digital signal processing circuit is comprised of a plurality of modules which are configured so that a specified set of the plurality of modules effects a specified number of iterations of interpolation. The modules are further designed so that additional modules may be added to the specified set of modules to increase the iterations of interpolation.

10 Claims, 4 Drawing Sheets

APPARATUS HAVING MODULAR INTERPOLATION ARCHITECTURE

CROSS REFERENCE TO RELATED APPLICATIONS

The following applications contain subject matter similar to the subject matter of this application:

U.S. patent application Ser. No. 428,614, filed Oct. 30, 1989; entitled "Apparatus Adaptable for Use in Effecting Communications Between an Analog Device and a Digital Device";

U.S. patent application Ser. No. 434,271, filed Oct. 30, 1989; entitled "Apparatus Having Shared Modular Architecture for Decimation and Interpolation";

U.S. patent application Ser. No. 428,628 filed Oct. 30, 1989; entitled "Apparatus Having a Modular Decimation Architecture"; and U.S. patent application Ser. No. 428,629, filed Oct. 30, 1989; entitled "Apparatus Having Shared Architecture for Analog-to-Digital and for Digital-to-Analog Signal Conversion".

BACKGROUND OF THE INVENTION

The present invention is directed to a communications interface apparatus adaptable for use with a digital-analog conversion device for effecting communications from a digital device to an analog device. Specifically, in its preferred embodiment, the present invention effects communications between a data processing device and a voice-band device, such as a telephone.

The present invention receives outgoing digital signals from the data processing device, interpolates those outgoing digital signals to produce an interpolated digital signal which is converted by the digital-analog conversion device to an outgoing analog signal representative of the outgoing digital signal. The outgoing analog signal is recognizable by the analog device.

In the manufacturing of interface devices such as the present invention, separate designs are often utilized to effect different numbers of iterations of interpolation of signals received from a digital device. Often there is duplication of engineering effort in designing such variously capable interpolation circuitry.

Such duplicate engineering effort results in each newly designed digital signal processing circuit involving essentially as much design effort, and cost, as a wholly new circuit.

The present invention is designed to overcome some of the expense of duplication of engineering effort to design variously capable digital signal processing circuits.

SUMMARY OF THE INVENTION

The invention is an apparatus adaptable for use with a digital-analog conversion device for effecting communications from a digital device to an analog device, having a digital-analog circuit for converting interpolated outgoing digital signals to outgoing analog signals. The apparatus further has a digital signal processing circuit for interpolating outgoing digital signals received from the digital device and providing an interpolated outgoing digital signal to the digital-analog device.

The digital signal processing circuit is comprised of a plurality of modules which are configured so that a specified set of the plurality of modules effects a specified number of iterations of interpolation. The modules are further designed so that additional modules may be added to the specified set of modules to increase the iterations of interpolation.

It is, therefore, an object of this invention to provide an apparatus adaptable for use in effecting communications from a digital device to an analog device which is modularly configured to facilitate satisfying differing system requirements.

A further object of this invention is to provide an apparatus adaptable for use in effecting communications from a digital device to an analog device, the manufacture of which may be accomplished with economies of engineering design effort.

Still a further object of this invention is to provide an apparatus adaptable for use in effecting communications from a digital device to an analog device which is inexpensive to adapt to various system requirements.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
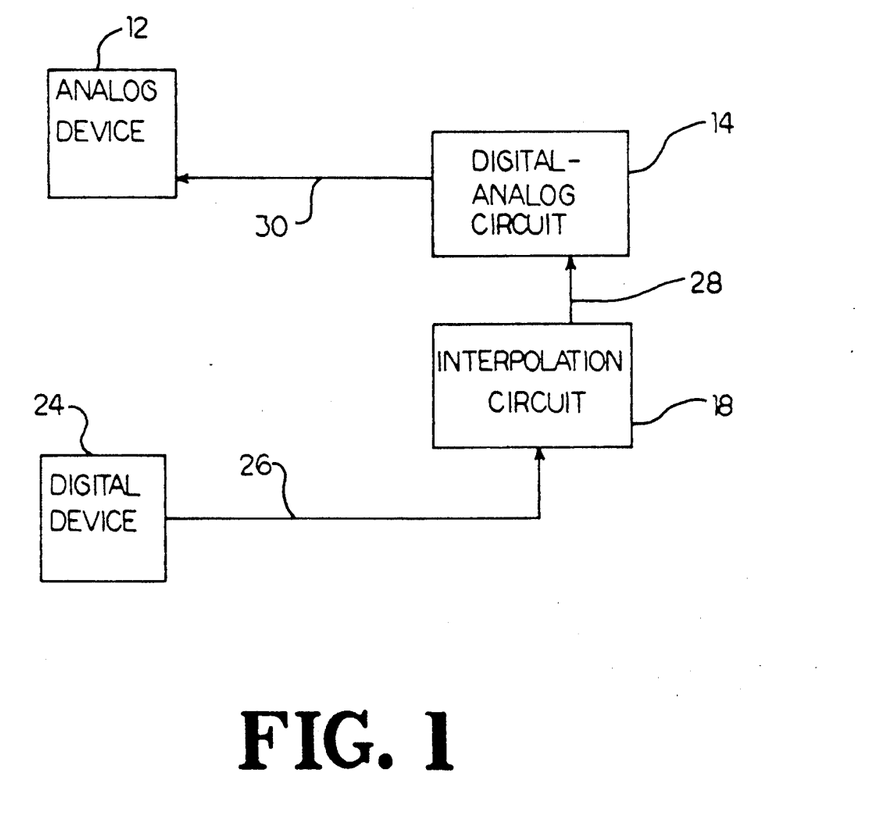
FIG. 1 is a schematic system block diagram of the environment in which the present invention is preferably employed.

The environment in which the preferred embodiment of the present invention is employed is illustrated in a schematic system block diagram in FIG. 1.

In FIG. 1, an analog device 12, such as a telephone voice instrument, is connected to an digital-analog circuit 14. Typically, the analog device 12 operates in the audio frequency range, approximately 300 Hz to 3.4 KHz. The digital-analog circuit 14 operates, in the preferred embodiment, at approximately 2 MHz. Some advantages are incurred by the high frequency operation of the digital-analog circuit 14: for example, a higher frequency of operation allows for closer spacing of components in the present invention when the invention is configured as an integrated circuit, i.e., a silicon chip construction; and the high frequency sampling allows for a more accurate digital representation of the incoming analog signal.

The digital device 24 provides outgoing digital signals to the interpolation circuit 18 via line 26. The interpolation circuit 18 performs an interpolation operation upon the outgoing digital signals received on line 26 and outputs interpolated digital signals via line 28 to the digital-analog circuit 14. The digital-analog circuit 14 receives the interpolated digital signals on line 28, converts those interpolated digital signals to outgoing analog signals, and provides the outgoing analog signals to the analog device 12 via line 30.

Figure 2:
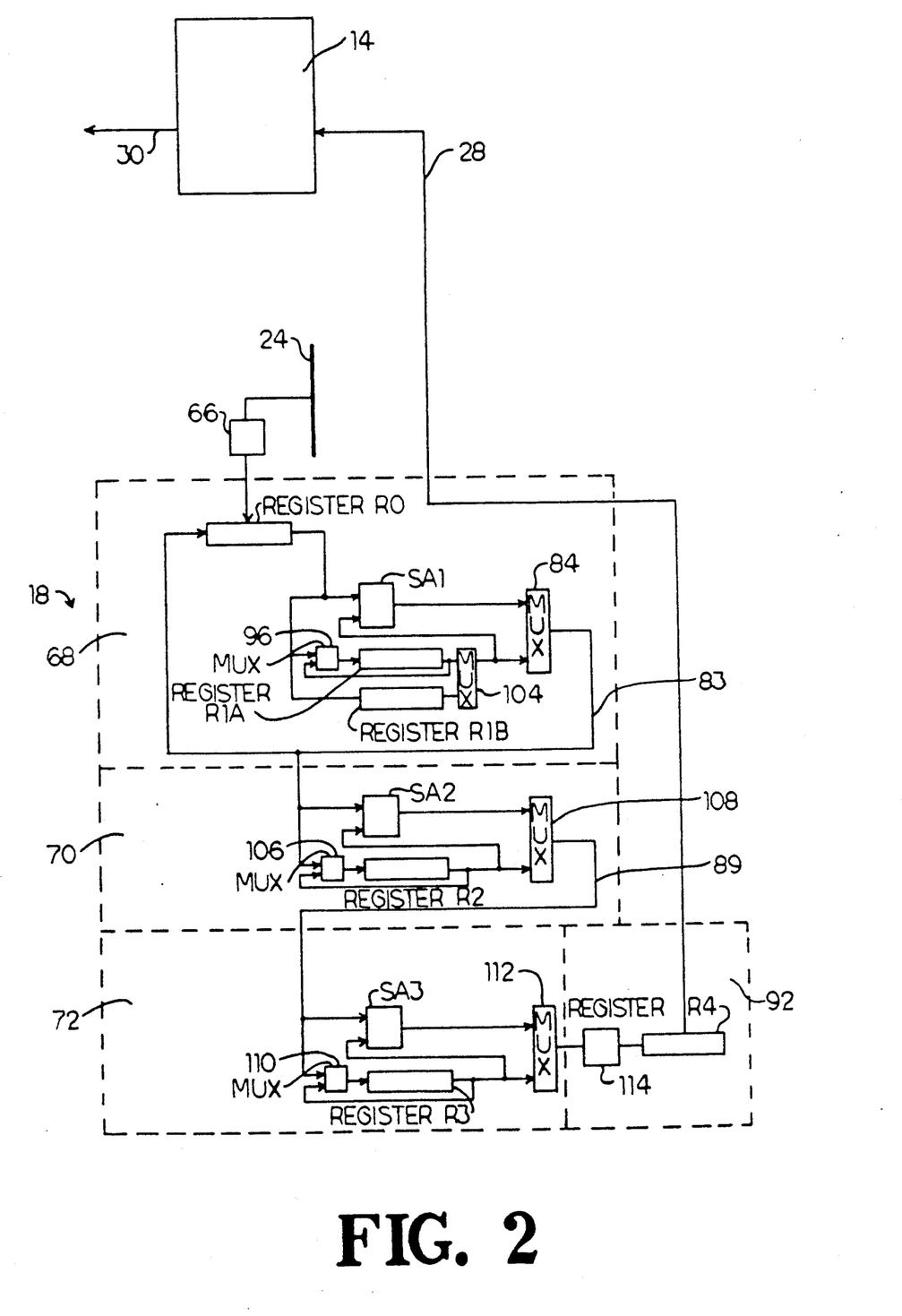
FIG. 2 is an electrical schematic diagram of the preferred embodiment of the present invention.

An electrical schematic diagram of the preferred embodiment of the present invention is presented in FIG. 2.

For purposes of clarity in describing the preferred embodiment of the present invention, like elements will be labelled with like reference numerals throughout this description.

In FIG. 2, a digital-analog circuit 14 outputs outgoing analog signals on line 30 to an analog device (not shown in FIG. 2). Further, the digital-analog circuit 14 receives interpolated digital signals from the interpolation circuit 18 via line 28.

The interpolation circuit 18 is preferably comprised of first digital cell circuit 68, second digital cell circuit 70, second digital cell circuit 72, and output circuit 92.

The first digital cell circuit 68 is preferably comprised of a shift register R0 receiving an input from digital input circuit 66 and providing an output to a one bit adder SA1, a multiplexer 96, and a shift register R1B. The output of multiplexer 96 is applied to a shift register R1A. The output of shift register R1A is applied to a multiplexer 104 as well as fed back to the multiplexer 96. Also applied to the multiplexer 104 is the output of shift register R1B. The output of multiplexer 104 is applied to multiplexer 84 as well as to one bit adder SA1. The output of adder SA1 is also applied to multiplexer 84. The output of multiplexer 84, which is also the output of first digital cell circuit 68, is applied to one bit adder SA2 of second digital cell circuit 70 as well as to shift register R0. Second digital cell circuit 70 further comprises a multiplexer 106 which also receives the output of multiplexer 84. The output of shift register R2 is applied to multiplexer 108 as well as fed back to multiplexer 106 and applied to one bit adder SA2. Also provided to multiplexer 108 is the output of one bit adder SA2. The output of multiplexer 108, which is also the output of second digital cell circuit 70, is applied to one bit adder SA3 and multiplexer 110 of second digital cell circuit 72. The output of multiplexer 110 is applied to register R3. Further in second digital cell circuit 72, the output of one bit adder SA3 is applied to multiplexer 112 and the output of multiplexer 110 is applied to shift register R3. The output of shift register R3 is applied to multiplexer 112, to one bit adder SA3, and to multiplexer 110. The output of multiplexer 112, which is also the output of second digital cell circuit 72, is applied to output circuit 92.

Specifically, the output of multiplexer 112 is applied to scaling subcircuit 114 which applies a scaled output to shift register R4. The output of shift register R4 is provided to digital-analog conversion device 14 via line 28.

The interpolation circuit 18 receives outgoing digital signals from the digital device output bus 24 via line 26, and conveys interpolated digital signals to the digital-analog circuit 14 via line 28. The digital-analog circuit 14 conveys outgoing analog signals to an analog device (not shown in FIG. 2) via line 30.

The interpolation circuit 18 preferably effects interpolation of outgoing digital signals using a four stage structure having a transfer function of the form:

$$1/256 (1-z^{-1})^2(1-z^{-2})^2(1+z^{-4})^2(1+z^{-8})^2 = H_I(z) \quad (12)$$

Equation (12) can be realized as four cascaded blocks of the form $H_{jl}(z)$ where:

$$H_l(z) = [H_{1l}(z) * H_{2l}(z) * H_{3l}(z) * H_{4l}(z)] \quad (13)$$
$$\text{where } H_{1l}(z) = \tfrac{1}{4}(1 + 2z^{-1} + z^{-2}),$$
$$H_{2l}(z) = \tfrac{1}{4}(1 + 2z^{-2} + z^{-4}), \text{ etc.}$$

for each of the terms in Equation (12).

For example, with a sampling rate of 16 KHz at the input of register R0, the output frequency of the interpolated digital signal is 256 KHz (i.e., x 16).

When interpolating by a factor of 2, using the transfer function of Equation (13), zeroes are inserted into the time-domain implementation between successive samples so that the output is at twice the input rate.

The time-domain implementation of this interpolation is represented by:

$$y_1(n) = \tfrac{1}{4}[x(n) + 2x(n-1) + x(n-2)] \quad (14)$$

where the alternate samples are zeroes so that the samples $x(n-2)$, $x(n-1)$, $x(n)$ become:

$$x(n-2), 0, x(n-1), 0, x(n), 0, x(n-1) \quad (15)$$

The four stage interpolator is therefore implemented as:

Thus, by way of illustration, in the first ($I_1$) stage. $I_{10}$ $(n-1)$ equals:

$$I_{10}(n-1) = \tfrac{1}{2}[x(n-1) - 0 + x(n-2)] \quad (16)$$

and:

$$I_{11}(n-1) = \tfrac{1}{2}[0 + 2x(n-1) - 0] \quad (17)$$

The scaling factor has been adjusted to one-half to compensate for the inserted zeroes.

Interpolation factor implementation functions hereinafter will, for the sake of clarity, be designated in the form: $I_{abbbb...}(n)$, where "a" indicates the interpolator stage involved (a=1, 2, 3, 4), and "bbbb..." indicates successive interpolation factors.

Thus, through the zero-insertion operation described above, each interpolator stage ($I_1$, $I_2$, $I_3$, $I_4$) generates two time-domain implementations for each input. Interpolator stage $I_4$, therefore, will generate sixteen time-domain interpolation factors.

For example, interpolator stage $I_1$ will generate:

$$I_{10}(n) = \tfrac{1}{2}[x(n) + x(n-1)]; \text{ and} \quad (18)$$

$$I_{11}(n) = \tfrac{1}{2}[2x(n)] \quad (19)$$

Thus, for one stage of the interpolator where, for example, sample $x(n)$ arrives, the block $I_1$ outputs twice before $x(n+1)$ arrives where the two outputs are of the form of Equations (18) and (19).

Figure 3:
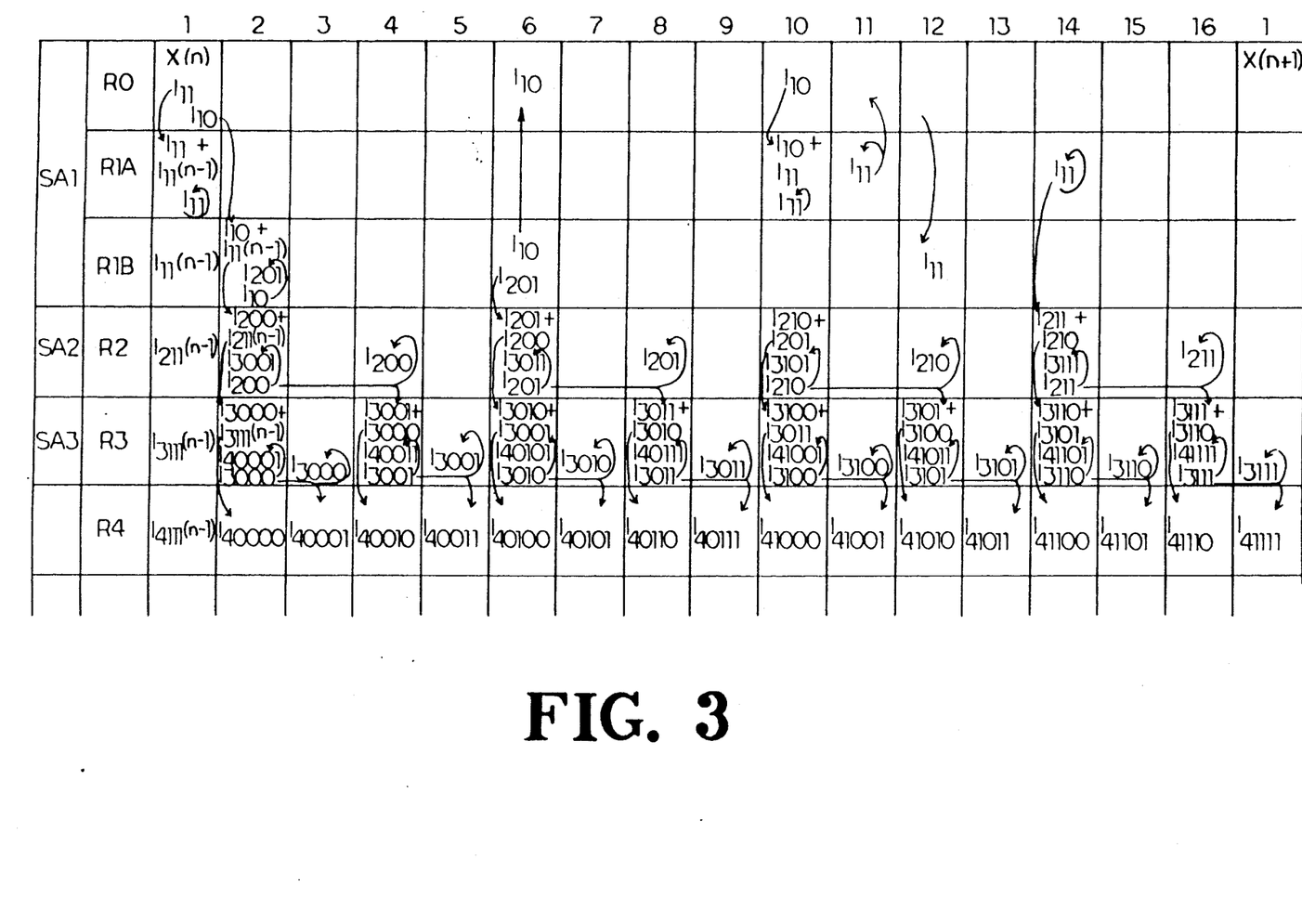
FIG. 3 is a space-time domain matrix representation of the interpolation circuit of the present invention for implementation of the interpolation transfer function.

The entire interpolation chain can then be generated for one input sample $x(n)$ to produce output samples, as illustrated below:

| $I_{10}(n)$ | $I_{200}(n)$ | $I_{3000}(n)$ | $I_{40000}(n)$ |
|---|---|---|---|
| | | | $I_{40001}(n)$ |
| | | $I_{3001}(n)$ | $I_{40010}(n)$ |
| | | | $I_{40011}(n)$ |
| | $I_{201}(n)$ | $I_{3010}(n)$ | $I_{40100}(n)$ |
| | | | $I_{40101}(n)$ |
| | | $I_{3011}(n)$ | $I_{40110}(n)$ |
| | | | $I_{40111}(n)$ |
| $I_{11}(n)$ | $I_{210}(n)$ | $I_{3100}(n)$ | $I_{41000}(n)$ |
| | | | $I_{41001}(n)$ |
| | | $I_{3101}(n)$ | $I_{41010}(n)$ |
| | | | $I_{41011}(n)$ |
| | $I_{211}(n)$ | $I_{3110}(n)$ | $I_{41100}(n)$ |
| | | | $I_{41101}(n)$ |
| | | $I_{3111}(n)$ | $I_{41110}(n)$ |
| | | | $I_{41111}(n)$ | where $I_{10}(n) = \frac{1}{2}(x(n) + x(n-1))$
$I_{11}(n) = x(n)$
$I_{200}(n) = \frac{1}{2}(I_{10}(n) + I_{11}(n-1))$
$I_{201}(n) = I_{10}(n)$
$I_{210}(n) = \frac{1}{2}(I_{10}(n) + I_{11}(n))$
$I_{211}(n) = I_{11}(n)$
$I_{3000}(n) = \frac{1}{2}(I_{200}(n) + I_{211}(n-1))$
$I_{3001}(n) = I_{200}(n)$
$I_{3010}(n) = \frac{1}{2}(I_{200}(n) + I_{201}(n))$
$I_{3011}(n) = I_{201}(n)$
$I_{3100}(n) = \frac{1}{2}(I_{201}(n) + I_{210}(n))$
$I_{3101}(n) = I_{210}(n)$
$I_{3110}(n) = \frac{1}{2}(I_{210}(n) + I_{211}(n))$
$I_{3111}(n) = I_{211}(n)$
$I_{40000}(n) = \frac{1}{2}(I_{3000}(n) + I_{3111}(n-1))$
$I_{40001}(n) = I_{3000}(n)$
$I_{40010}(n) = \frac{1}{2}(I_{3000}(n) + I_{3001}(n))$
$I_{40011}(n) = I_{3001}(n)$
$I_{40100}(n) = \frac{1}{2}(I_{3001}(n) + I_{3010}(n))$
$I_{40101}(n) = I_{3010}(n)$
$I_{40110}(n) = \frac{1}{2}(I_{3010}(n) + I_{3011}(n))$
$I_{40111}(n) = I_{3011}(n)$
$I_{41000}(n) = \frac{1}{2}(I_{3011}(n) + I_{3100}(n))$
$I_{41001}(n) = I_{3100}(n)$
$I_{41010}(n) = \frac{1}{2}(I_{3100}(n) + I_{3101}(n))$
$I_{41011}(n) = I_{3101}(n)$
$I_{41100}(n) = \frac{1}{2}(I_{3101}(n) + I_{3110}(n))$
$I_{41101}(n) = I_{3110}(n)$
$I_{41110}(n) = \frac{1}{2}(I_{3110}(n) + I_{3111}(n))$
$I_{41111}(n) = I_{3111}(n)$ The interpolation circuit 18 effects interpolation as illustrated in FIG. 3. Prior to the arrival of a sample $x(n)$, the previous sample $x(n-1)$ resides in shift registers R1A, R1B, R2, and R3. This situation occurs directly as a result of the computational scheme and, following the generation of 16 outputs from one input sample $x(n)$, the sample $x(n)$ will be held in shift registers R1A, R1B, R2, and R3.

This situation simplifies the structure of interpolation circuit 18 because, as may be ascertained by inspection, $I_{11}(n-1) = x(n-1)$ and is required to compute $I_{10}(n)$ Similarly, $I_{200}(n)$ requires $I_{11}(n-1)$, for computation; and $I_{3000}(n)$ requires $I_{211}(n-1)$, i.e., $I_{11}(n-1)$; and $I_{40000}(n)$ requires $I_{3111}(n-1)$, i.e., $I_{211}(n-1)$, i.e., $I_{11}(n-1)$ Referring to FIG. 3, columnar divisions of the matrix are delineated at the top of the matrix in time periods 1-16 and 1, indicating the first clock pulse in the next cycle. Each period is one clock pulse in duration. Row divisions are representative of the various registers R0, R1A, R1B, R2, R3, and R4 with associated serial adders SA1, SA2, and SA3 within the interpolation circuit 18.

Accordingly, each box in the matrix of FIG. 3 represents the function(s) performed by a specific register and serial adder during a specific time period.

Referring to FIG. 3, during period 1, sample $x(n)$ is loaded in register R0 from output bus 24 via line 26 and digital input circuit 66, the contents of register R1A (sample $x(n-1)$) and the contents of register R0 (sample $x(n)$) are added in serial adder SA1 and the result of that summation, which is $I_{10}$, is shifted into register R0 $x(n)$, which is $I_{11}$, is written back into register R1A.

Thus, there resides at this point in time within register R1A the sample $x(n)$, which is also interpolation factor $I_{11}(n)$. The "one-half" factor required to compute certain of the interpolation factors (such as, $I_{10}(n)$, $I_{200}(n)$, and so on) is provided by clocking control. That is, when a "one-half" factor is required for an interpolation factor calculation, the elements of that calculation are combined as required and stored in a register. Then the elements are shifted one place to the right (i.e., $\div 2$) prior to completion of the calculation of that respective interpolation factor. In such manner, the least significant adder output bit is lost and the second least significant output bit becomes the least significant output bit, i.e., $\div 2$.

There is a symmetry about FIG. 3 which, however, does not extend to the operation of adder SA1. There is a pipelining of computations to ensure that the next required computation to be performed by adder SA1 occurs in period 2. This results in the first interpolation factor ($I_{40000}$) actually being shifted into register R4 during period 2. If adder SA1 were employed during period 1 to perform the calculations necessary to produce $I_{40000}$ during period 1, then adder SA1 would need to operate at a frequency greater than 10 MHz.

By pipelining calculations, as illustrated in FIG. 3, the last interpolation factor ($I_{41111}(n-1)$) for the previous cycle, which requires no calculations be performed by adder SA1, is shifted into register R4 during period 1.

Thus, adder SA1 may be operated at the same speed as adders SA2 and SA3, preferably yielding an interpolator output period of approximately 3.9 $\mu$ sec.

Continuing in FIG. 3, during time period 2, the register R1B contents ($I_{11}(n-1)$) are added with the contents of register R0 ($I_{10}$), appropriately scaled, to calculate interpolation factor $I_{200}$, and $I_{200}$ is shifted to register R2. Further during time period 2, the contents of register R2 ($I_{211}(n-1) = I_{11}(n-1)$) are combined with $I_{200}$ by adder SA2 to produce $I_{3000}$ and that result is shifted to register R3. Adder SA3 combines $I_{3000}$ with the contents of register R3 ($I_{3111}(n-1) = I_{11}(n-1)$ which has remained in register R3 since the previous calculation cycle) to calculate $I_{40000}$, and $I_{40000}$ is shifted to register R4 during period 2.

During period 2, $I_{10}/I_{210}$ is rewritten into register R1B, $I_{200}/I_{3001}$ is rewritten into register R2, and $I_{3000}/I_{40001}$ is rewritten into register R3.

During time period 3 in FIG. 3, register R1A continues to store sample $x(n)$ (also $I_{11}$), register R1B is storing $I_{10}/I_{201}$, register R2 is storing $I_{200}/I_{3001}$, register R3 writes $I_{40001}$ (which is also $I_{3000}$) into register R4, and $I_{3000}/I_{40001}$ is rewritten into register R3.

During time period 4 in FIG. 3, register R1A continues to retain $I_{11}$ in storage. Adder SA3 combines $I_{3001}$ from register R2 with $I_{3000}$ from register R3 to calculate $I_{40010}$, with appropriate scaling by right-shifting as previously described. $I_{3001}/I_{40011}$ is rewritten into register R3 and $I_{200}$ is rewritten into register R2.

During time period 5 in FIG. 3, register R1A continues to store $I_{11}$, register R3 shifts $I_{3001}/I_{40011}$ to register R4, and $I_{3001}$ is rewritten into register R3.

During the sixth time period illustrated in FIG. 3, interpolation factor $I_{10}/I_{201}$ is shifted to shift register R0 in order that the factor $I_{10}$ will be available for subsequent computation of $I_{210}$ (later, in time period 10). Further, in time period 6, the then-contents of register R2 ($I_{200}$) are combined with the output of first digital cell circuit 68 ($I_{201}$ clocked from shift register R1B) by adder SA2 to produce $I_{3010}$. $I_{3010}$ is combined by serial adder SA3 with the then-contents of register R3 ($I_{3001}/I_{40011}$) to yield $I_{40100}$. $I_{3011}/I_{201}$ is rewritten to register R2 and $I_{3010}/I_{40101}$ is rewritten to register R3.

During time period 7, $I_{40101}$ is written from register R3 into register R4, and is also rewritten to register R3.

In time period 8, serial adder SA3 combines $I_{3011}$ from register R2 with the then-existing contents of register R3 ($I_{3010}$) to produce $I_{40110}$. Also during period 8, $I_{201}/I_{3011}$ is rewritten to register R2, $I_{3011}/I_{40111}$ is rewritten to register R3, and $I_{40110}$ is written to register R4.

In time period 9, $I_{40111}$ is written into register R4 and is rewritten into register R3 for later use.

In time period 10, the contents of register R0 ($I_{10}$), written into register R0 during time period 6, are combined by adder SA1 with the contents of register R1A ($I_{11}$) to produce $I_{210}$ which is, in turn, combined by adder SA2 with the then-contents of register R2 ($I_{201}$) to produce $I_{3100}$. $I_{11}$ is rewritten to register R1A. $I_{3100}$ is combined by adder SA3 with the then-contents of register R3 ($I_{3011}$) to produce $I_{41000}$, and $I_{41000}$ is written to register R4. Also during period 10, $I_{3100}/I_{41001}$ is rewritten to register R3, and $I_{210}/I_{3101}$ is rewritten to register R2.

During period 11, $I_{11}$ is written from register R1A to register R0 and also rewritten to register R1A. Also during period 11, $I_{41001}$ is written to register 4 and $I_{310.0}/I_{41001}$ is rewritten into register R3.

In time period 12, the contents of register R0 ($I_{11}$) are written to register R1B for further use during the next pass. Adder SA3 combines $I_{3101}$ with the then-contents of register R3 ($I_{3100}$) to produce $I_{41010}$. Also during period 12, $I_{210}/I_{3101}$ is rewritten to register R2, $I_{3101}/I_{41011}$ is rewritten to register R3, and $I_{41010}$ is written to register R4.

During period 13, $I_{41011}$ is written to register R4; and $I_{3101}/I_{41011}$ is rewritten to register R3.

During period 14, adder SA2 receives $I_{11}/I_{211}$ from register R1A and combines $I_{211}$ with the then-contents of register R2 ($I_{210}$) to produce $I_{3110}$. Adder SA3 receives $I_{3110}$ from register R2 and combines $I_{3110}$ with the then-existing contents of register R3 ($I_{3101}$) to produce $I_{41100}$ and writes $I_{41100}$ to register R4. Also during period 14, $I_{11}$ is rewritten to register R1A, $I_{211}/I_{3111}$ is rewritten to register R2, and $I_{3110}/I_{41101}$ is rewritten to register R3.

During time period 15, $I_{41101}$ is written into register R4; and $I_{3110}/I_{41101}$ is rewritten into register R3.

During period 16, adder SA3 receives $I_{211}/I_{3111}$ from register R2 and combines $I_{211}/I_{3111}$ with the then-contents of register R3 ($I_{3110}$) to produce $I_{41110}$ and writes $I_{211}/I_{3111}$ to register R4. Also during period 16, $I_{211}/I_{3111}$ is rewritten to register R2, and $I_{3111}/I_{41111}$ is rewritten to register R3.

During time period 1 of the next ($x(n+1)$) cycle, $I_{41111}$ is written to register R4 and $I_{3111}/I_{41111}$ is rewritten into register R3. At the same time, register R0 receives the next sample, $x(n+1)$, for interpolation.

Consequently, registers R1A, R1B, R2, and R3 all now contain $x(n)$ available for computations during the next pass when sample $x(n+1)$ is interpolated in the subsequent cycle.

Further, the sixteen interpolation samples have been generated from the one original sample $x(n)$ and have been passed to register R4; they may be clocked from register R4 via line 28 to digital-analog device 14 for conversion to an outgoing analog signal as previously described.

Figure 4:
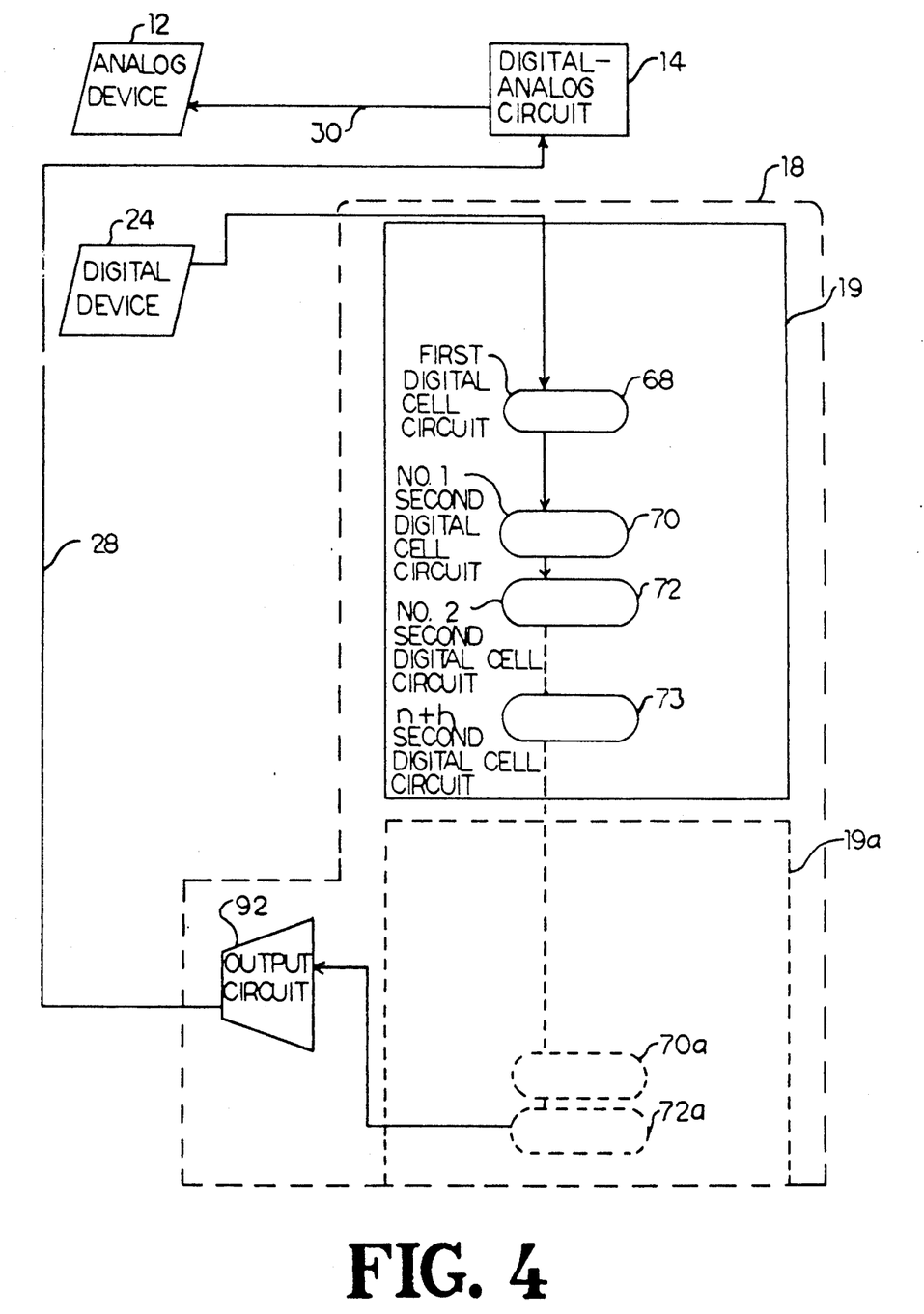
FIG. 4 is a schematic block diagram illustrating the modular design of the preferred embodiment of the present invention.

Referring to FIG. 4, a schematic block diagram illustrating the modular design of the preferred embodiment of the present invention is presented. The interpolation circuit 18 is comprised of interpolator module 19. Additional interpolator modules may be added to effect further interpolation as desired; such additional optional interpolator modules are represented in FIG. 4 by the dotted-line representation for interpolator module 19a. The interpolator module 19 is comprised of a first digital cell circuit 68, and second digital cell circuits 70, 72, 73. Second digital cell circuits within a given interpolator module 19 may be added to effect greater degrees of interpolation as desired, as indicated by second digital cell circuits 72 and 73. Additional interpolator modules 19a necessarily will contain second digital cell circuits 70a for each interpolation by a factor of 2; the number of second digital cell circuits 70a, 72a need not be identical among the various interpolator modules 19, 19a.

The last of the second digital cell circuits 73 in the interpolator module 19 provides input to second digital cell circuit 70a of a subsequent decimator-interpolator module 19a.

The last second digital cell circuit 72a of the last interpolator module 19a provides outputs to output circuit 92 from which interpolated digital signals are passed to digital-analog circuit 14 via line 28.

It is to be understood that, while the detailed drawings and specific examples given describe preferred embodiments of the invention, they are for the purpose of illustration only, that the apparatus of the invention is not limited to the precise details and conditions disclosed, and that various changes may be made therein without departing from the spirit of the invention which is defined by the following claims.

We claim:

1. An apparatus for use with a digital-analog conversion device for effecting communications from a digital device to an analog device, said digital-analog conversion device being operatively connected to said analog device and to the apparatus and converting interpolated digital signals received from the apparatus into outgoing analog signals representative of said interpolated digital signals, said outgoing analog signals being recognizable by said analog device, the apparatus comprising:

an interpolator means for interpolating outgoing digital signals received from said digital device and providing said interpolated digital signals to said digital-analog conversion device;

said interpolator means comprising a digital input circuit, a plurality of digital cell circuits, and an output means for providing output from said interpolator means;

said plurality of digital cell circuits being arranged serially whereby each of said plurality of digital cell circuits after a first of said plurality of digital cell circuits receives as its respective input the output of the next preceding of said plurality of digital cell circuits;

said digital input circuit receiving said outgoing digital signal from said digital device and producing an outgoing clocked input to said plurality of digital cell circuits;

said first of said plurality of digital cell circuits producing a first iteration interpolated digital signal in response to reception of said outgoing clocked input;

each succeeding of said plurality of digital cell circuits selectively producing an nth iteration interpolated digital signal in response to receiving an n−1 iteration interpolated digital signal;

the last of said plurality of digital cell circuits being operatively connected to provide its respective outputs to said output means;

said output means providing said interpolated digital signal to said digital-analog conversion device.

2. An apparatus for use with a digital-analog conversion device for effecting communications from a digital device to an analog device, said digital-analog conversion device being operatively connected to said analog device and to the apparatus and converting interpolated digital signals received from the apparatus into outgoing analog signals representative of said interpolated digital signals, said outgoing analog signals being recognizable by said analog device, the apparatus comprising:

an interpolator means for interpolating outgoing digital signals received from said digital device and providing said interpolated digital signals to said digital-analog conversion device;

said interpolator means comprising a first interpolator module, and an output means for providing digital outputs, said first interpolator module comprising a first digital cell circuit, and a second digital cell circuit;

said first digital cell circuit producing a first iteration interpolated digital signal to said second digital cell circuit in response to reception of said outgoing clocked input;

said second digital cell circuit producing a second iteration interpolated digital signal in response to reception of said first iteration interpolated digital signal;

the products of said second digital cell circuit being the outputs of said first interpolator module;

said second digital cell circuit being operatively connected to provide its respective outputs to said output means.

3. An apparatus for use with a digital-analog conversion device for effecting communications from a digital device to an analog device as recited in claim 2 wherein said interpolator means further comprises a second interpolator module;

said second interpolator module comprising a secondary digital cell circuits;

said second interpolator module receiving as its input said outputs of said first interpolator module and the products of said second interpolator module being operatively connected to said output means.

4. An apparatus for use in effecting communications from a digital device to an analog device as recited in claim 3 wherein said secondary digital cell circuit is substantially the same as said second digital cell circuit.

5. An apparatus adaptable for use with a digital-analog conversion device for effecting communications from a digital device to an analog device as recited in claim 2 wherein said at least one second digital cell circuit is two second digital cell circuits.

6. An apparatus for use with a digital-analog conversion device for effecting communications from a digital device to an analog device as recited in claim 4 wherein said second digital cell circuit comprises a plurality of second digital circuits;

said plurality of second digital circuits being arranged serially whereby each of said plurality of second digital circuits after a first of said plurality of second digital circuits receives as its respective input the output of the next preceding of said plurality of second digital circuits;

each succeeding of said plurality of second digital circuits producing an n+1 iteration interpolated digital signal in response to receiving an nth iteration interpolated digital signal;

the products of the last of said plurality of second digital circuits being the output of said first interpolator module;

said last of said plurality of second digital circuits being operatively connected to provide its respective outputs to said output means.

7. An apparatus for use with a digital-analog conversion device for effecting communications from a digital device to an analog device as recited in claim 2 wherein said interpolator means further comprises plurality of second interpolator modules;

said plurality of second interpolator modules being arranged serially whereby a first of said plurality of second interpolator modules receives as its input said outputs of said first interpolator module, and each of said plurality of second interpolator modules after said first of said plurality of second interpolator modules receives as its respective input the output of the next preceding of said plurality of second interpolator modules;

the products of the last of said plurality of second interpolator modules being operatively connected to said output means.

8. An apparatus for use with a digital-analog conversion device for effecting communications from a digital device to an analog device as recited in claim 6 wherein said interpolator means further comprises plurality of second interpolator modules;

said plurality of second interpolator modules being arranged serially whereby a first of said plurality of second interpolator modules receives as its input said outputs of said first interpolator module, and each of said plurality of second interpolator modules after said first of said plurality of second interpolator modules receives as its respective input the output of the next preceding of said plurality of second interpolator modules;

the products of the last of said plurality of second interpolator modules being operatively connected to said output means.

9. An apparatus for use with a digital-analog conversion device for effecting communications from a digital device to an analog device as recited in claim 7 wherein said secondary digital cell circuit comprises a plurality of secondary digital circuits;

said plurality of secondary digital circuits being arranged serially whereby each of said plurality of secondary digital circuits after a first of said plurality of secondary digital circuits receives as its respective input the output of the next preceding of said plurality of secondary digital circuits;

each succeeding of said plurality of secondary digital circuits producing an n+1 iteration interpolated digital signal in response to receiving an nth iteration interpolated digital signal;

the products of the last of said plurality of secondary digital circuits being the output of said first interpolator module;

said last of said plurality of secondary digital circuits being operatively connected to provide its respective outputs to said output means.

10. An apparatus for use with a digital-analog conversion device for effecting communications from a digital device to an analog device as recited in claim 8 wherein said secondary digital cell circuit comprises a plurality of secondary digital circuits;

said plurality of secondary digital circuits being arranged serially whereby each of said plurality of secondary digital circuits after a first of said plurality of secondary digital circuits receives as its respective input the output of the next preceding of said plurality of secondary digital circuits;

each succeeding of said plurality of secondary digital circuits producing an n+1 iteration interpolated digital signal in response to receiving an nth iteration interpolated digital signal;

the products of the last of said plurality of secondary digital circuits being the output of said first interpolator module;

said last of said plurality of secondary digital circuits being operatively connected to provide its respective outputs to said output means.

* * * * *